United States Patent
Smits

(10) Patent No.: US 7,962,566 B2
(45) Date of Patent: Jun. 14, 2011

(54) OPTIMIZED SESSION MANAGEMENT FOR FAST SESSION FAILOVER AND LOAD BALANCING

(75) Inventor: Thomas Smits, Epfenbach (DE)

(73) Assignee: SAP AG, Walldorf (DE)

( * ) Notice: Subject to any disclaimer, the term of this patent is extended or adjusted under 35 U.S.C. 154(b) by 1130 days.

(21) Appl. No.: 11/391,526

(22) Filed: Mar. 27, 2006

(65) Prior Publication Data
US 2007/0226214 A1 Sep. 27, 2007

(51) Int. Cl.
*G06F 15/16* (2006.01)
(52) U.S. Cl. ........ 709/217; 709/218; 709/219; 709/227; 709/228; 709/229; 711/100; 370/216
(58) Field of Classification Search .................... 709/217
See application file for complete search history.

(56) References Cited

U.S. PATENT DOCUMENTS

| | | | |
|---|---|---|---|
| 6,052,695 A * | 4/2000 | Abe et al. ....................... 707/202 |
| 6,253,226 B1 | 6/2001 | Chidambaran et al. |
| 6,490,610 B1 * | 12/2002 | Rizvi et al. .................... 707/202 |
| 6,496,847 B1 * | 12/2002 | Bugnion et al. ................. 718/1 |
| 6,931,624 B1 * | 8/2005 | Snider ........................... 717/108 |
| 7,451,434 B1 | 11/2008 | Blumenthal et al. |
| 7,640,249 B2 | 12/2009 | Smits |
| 7,657,887 B2 | 2/2010 | Kothandaraman et al. |
| 7,747,741 B2 | 6/2010 | Basani et al. |
| 7,761,431 B2 | 7/2010 | Blea et al. |
| 2004/0025169 A1 | 2/2004 | Wiser et al. |
| 2004/0133644 A1 | 7/2004 | Warren et al. |
| 2004/0215709 A1 | 10/2004 | Basani et al. |
| 2005/0080801 A1 | 4/2005 | Kothandaraman et al. |
| 2005/0091388 A1 | 4/2005 | Kamboh et al. |
| 2005/0144170 A1 | 6/2005 | Wiser et al. |
| 2006/0106886 A1 | 5/2006 | McKee et al. |
| 2008/0072240 A1 * | 3/2008 | Gschiermeister et al. .... 719/316 |

OTHER PUBLICATIONS

Office Action mailed Feb. 19, 2008, U.S. Appl. No. 11/393,197, filed Mar. 29, 2006, 13 pgs.
Non-Final Office Action dated Feb. 19, 2008, U.S. Appl. No. 11/393,197, filed Mar. 29, 2006, 13 pgs.
Non-Final Office Action for U.S. Appl. No. 11/393,197, Mailed Feb. 12, 2009, 15 pages.
Smits, Thomas, Final Office Action dated Aug. 22, 2008, U.S. Appl. No. 11/393,197, filed Mar. 29, 2006, 13 pgs.
Notice of Allowance for U.S. Appl. No. 11/393,197, Mailed Aug. 14, 2009, 17 pages.
CCU COMM, "C++ support for Object-Oriented Programming", Advanced Network Technology, 11 pages.
Microsoft Corporation, "Introduction to Shadow Copies of Shared Folders", Microsoft Corporation, Published: Mar. 2003, Microsoft® Windows Server™ 2003 White Paper, (Mar. 2003), 18 pages.
Non-Final Office Action mailed Jun. 22, 2010 for U.S. Appl. No. 12/617,597, 17 Pages.
Final Office Action for U.S. Appl. No. 12/617,597 Mailed Dec. 20, 2010, 16 Pages.

* cited by examiner

*Primary Examiner* — Dohm Chankong
*Assistant Examiner* — Neeraj Utreja
(74) *Attorney, Agent, or Firm* — Blakely Sokoloff Taylor & Zafman, LLP

(57) ABSTRACT

A system and method of improving session management to facilitate failover and load balancing conditions. During the session, session data is segregated into a first set of core/non-derivable data and a second subset of data that can be derived from the core data. The core data is persistently stored. When a failover condition occurs, the recovering system is provided access to the core data to permit recreation of the session.

19 Claims, 4 Drawing Sheets

OPTIMIZED SESSION MANAGEMENT FOR FAST SESSION FAILOVER AND LOAD BALANCING

BACKGROUND OF THE INVENTION

Embodiments of the invention relate to session management. More specifically, embodiments of the invention relate to session management during failover and migration of sessions between servers in a load balancing situation.

BACKGROUND

The term, "session" commonly refers to data representing an interaction between a client and a server. Another common term referring to the same kind of data is "conversational state" because the session comprises the state that was created on the server due to the conversation between client and server. Different session concepts are used in practice with the HttpSession of Java Servlets as one important example. While the Java Servlet concept for sessions is flat, having no hierarchy inside the session data, the web based SAP Web-Dynpro sessions can have different scopes building a hierarchy of sessions. The session data is normally associated with one particular user accessing the application on the server via the client.

Sessions are commonly implemented using a token that is transported between the client and the server with each request. The token for example may be a hyper text transfer protocol (HTTP) cookie or the username of the user using the client. A token is used as a key for an associative array (for example, java.util.Map) that contains the session data. The data is typically organized as name/value pairs with the name often restricted to a string and the value allowing nearly any kind of object. The data stored in the session is required to serve requests from the corresponding client. If the data is not available the client cannot be served. This makes the session data very important and necessitates additional mechanisms in case of server problems. One kind of problem a server may encounter is software or hardware errors. Another is high load situations. In either case, the server may not be able to serve requests from the clients for which it is holding the session data. Therefore, the requests must be served by another server, but this requires a mechanism to move the session data to the new server. A common term for this movement in case of an error on the server is called "failover" but the same argument applies to high load and therefore "load-balancing" situations. To support failover, some implementations require the session data, i.e. the objects in the session, to be serializable. Movement of sessions between servers or server nodes always requires serialization, copying or cloning of existing session data. The time required to perform the failover depends heavily on the size of the session. In existing systems, large session sizes often preclude failover operations in productive environments.

SUMMARY OF THE INVENTION

A system and method of improving session management to facilitate failover is disclosed. During the session, session data is segregated into a first set of core/non-derivable data and a second subset of data that can be derived from the core data. The core data is stored outside the server process. When a failover condition occurs, the recovering system is provided access to the core data to permit recreation of the session.

BRIEF DESCRIPTION OF DRAWINGS

The invention is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

DETAILED DESCRIPTION

Figure 1:
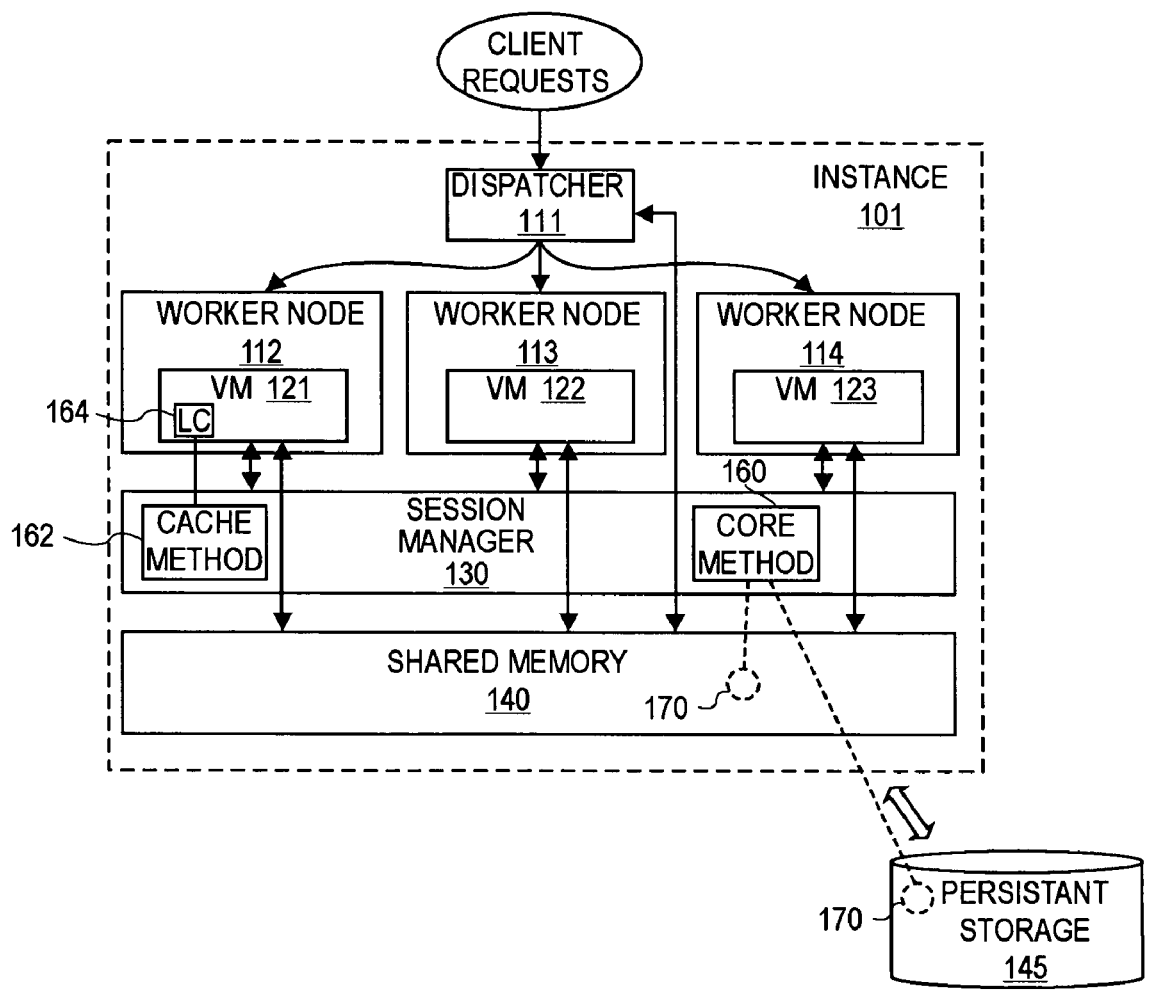
FIG. 1 is a block diagram of a logical view of a system architecture according to one embodiment of the invention.

FIG. 1 is a block diagram of a logical view of a system architecture according to one embodiment of the invention. The architecture may include a plurality of application server instances such as, instance 101. The application server instance 101 includes a group of worker nodes 112-114, and a dispatcher 111. Where a plurality of homogenous interconnected server instances exist, they are referred to as a "cluster." Although the following description will focus solely on instance 101 for the purpose of explanation, the same principles apply to other instances (not shown) within a cluster.

The worker nodes 112-114 within instance 101 provide the business and/or presentation logic for the network applications supported by the system. In case of a Java based application server, each worker contains a Java virtual machine (represented as virtual machines 121-123 in FIG. 1) to execute the business logic and to store the associated data. In case of non Java based server the architecture may not contain virtual machines. In one embodiment, the dispatcher 111 distributes service requests from clients to one or more of the worker nodes 112-114 using request queues stored in shared memory 140. The request handler 111 fills the queues with client requests and the worker nodes 112-114 consume the requests from each of their respective queues. In another embodiment, requests can be distributed to the worker nodes directly from queues maintained in the dispatcher's memory.

The worker nodes 112-114 may be Java 2 Enterprise Edition ("J2EE") worker nodes which support Enterprise Java Bean ("EJB") components of EJB containers (at the business layer) and Servlets and Java Server Pages ("JSP") (at the presentation layer). In one embodiment, the virtual machines 121-125 implement the Java 2 Standard Edition Specification 1.3, published Jul. 27, 2001 or subsequent versions thereof (the J2SE Standard). It should be noted, however, that the embodiments of the invention described herein may be implemented in the context of various different software platforms including, by way of example, Microsoft.NET platforms and/or the Advanced Business Application Programming ("ABAP") platforms developed by SAP AG, of Walldorf, Germany.

In one embodiment, a session manager 130 is executed within the instance 101. The session manager 130 includes the program code, interfaces and data for implementing the various session management techniques described herein. The session manager 130 stores data in a session context responsive to an application. Traditionally, a great amount of the data in the session context is used like a cache for a particular user. While much of the data is not truly essential to handle user request, recreating that data for each request from scratch is too expensive in terms of CPU usage. By segregating the essential (core) data from the nonessential data, faster failover can be achieved. As used herein, "core" when modifying data refers to data that is not otherwise derivable by the application or the system from other entries in the session. This data is essential to continue processing user requests. For example, user entered data not persisted elsewhere in the system would be core data. If the data is derivable from the core data or elsewhere in the system, it is referred to herein interchangeably as cache session data or derivable data.

One embodiment of the session manager 130 manages session objects with session domains as described in detail below. Generally, session manager 130 receives requests to store data in the session from the application that is running on the worker nodes 112-114. An application within the application server may provide a hint to the session manager 130 whether the stored data contains or does not contain core data. In one embodiment, the session manager 130 may include two methods: a core method and a cache method 162 to store core and cache data respectively. "Core method" refers to a method used to process the core data to create a core session object. "Cache method" refers to a method to process cache session or derivable data. The core method creates a core session object to retain the core data and adds core data to that object as additional core data is received. In one embodiment, the hint may take the form of calling the respective method to handle the request.

In one embodiment, the core session object is persisted in shared memory 140 using for example Shared Closures. In another embodiment, the core session object is persisted to persistent storage 145. In various embodiments, core session may be persisted to a database or to a file system. The cache method 162 handles the derivable data also referred to as the cache session data. This data may be managed as a separate object from the core session object. In one embodiment, the data is merely maintained in the local cache 164 of the server handling the session. In another embodiment, the cache data may be retained in shared memory, but is not passed/copied to a receiving server in the event of failover and may in fact be lost during the failure condition necessitating failover. The merits of this latter embodiment depend on the cost, e.g., in terms of CPU time, of copying from shared memory as opposed to recreating the session from the core session object.

Figure 2B:
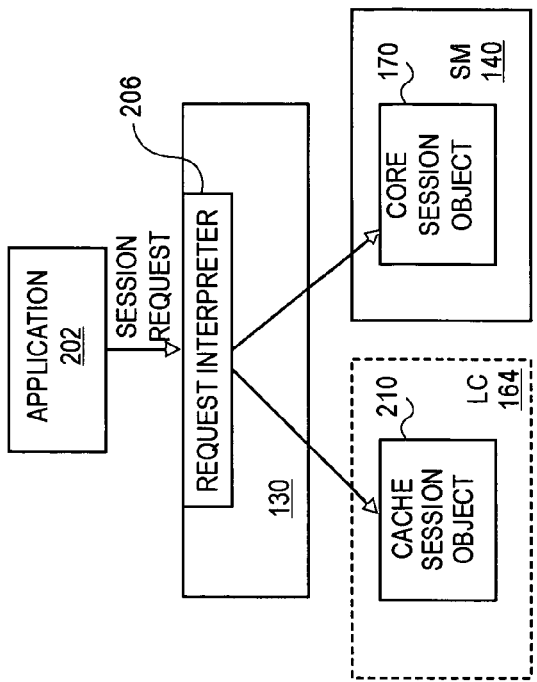
FIG. 2B is a block diagram of one embodiment of a portion of the system of an alternate embodiment of the invention.
Figure 2A:
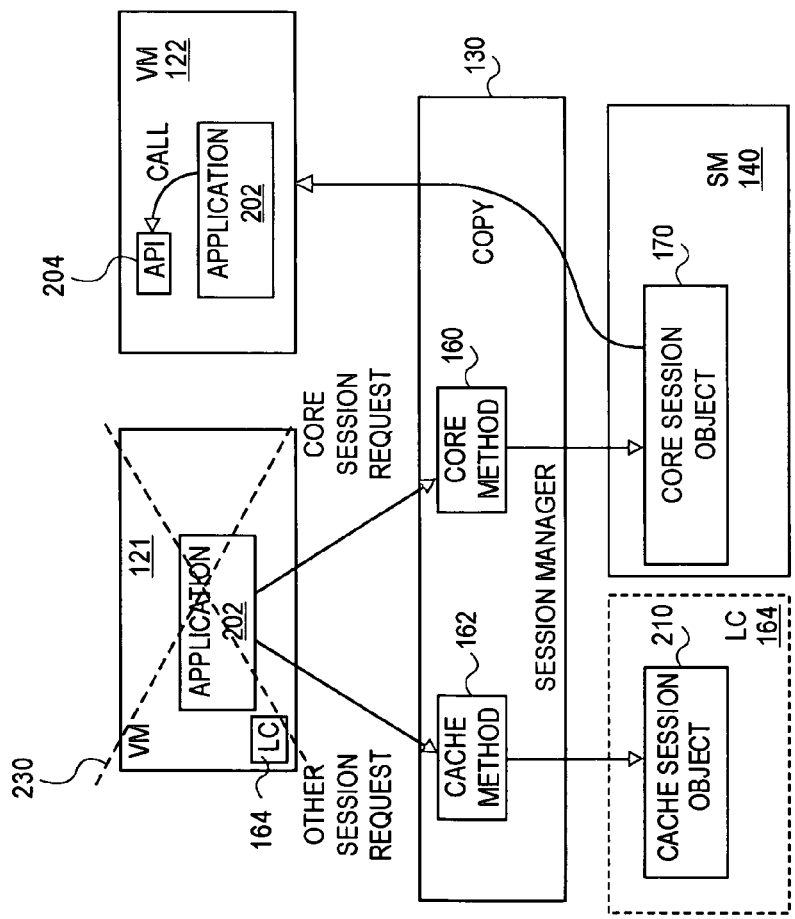
FIG. 2A is a block diagram of a portion of system of one embodiment of the invention.

FIG. 2A is a block diagram of a portion of system of one embodiment of the invention. A VM 121 includes an application 202 engaged in the session. Application 202 issues session requests constituting either core session requests or other session requests. In the shown embodiment, core session requests take the form of a method call to the core method 160 and other method requests include a method calls to cache method 162. In this manner, the session manager 130 is instantly aware of whether the request includes core data or not. Calls to the core method 160 result in the corresponding data being retained as part of core session object 170. Calls to cache method 162 results in the data being retained in cache session object 210. Session manager 130 manages both cache session object 210 and core session object 170 for the session. Cache session object 210 may be managed in local cache 164 of VM 121 while core session object 170 is managed in shared memory. However, in the event of a failure condition (depicted in the drawing as X 230 representing failure of the VM 121), the cache session object 210 is discarded (in practice it may have been lost in the failure event, e.g., because VM 121 fails and local cache 164 is lost) and the core session object 170 is passed to application 202 running in VM 122. Session manager 130 may pass the core session object 170 or a handle to the object to the application that is to take over the session. In one embodiment, at start up, the various applications, e.g., 202 that use the session manager 130 registers the logic that can recreate the session with the session manager 130. In such an embodiment, information required to recreate a cache session from the core session object is part of the business logic. In one embodiment, application 202 may call a recreate method in application programming interface (API) 204. API 204 will then derive/recreate the cache session data (which is' defined to be derivable from the core session data). Application 202 and VM 122 can continue the session at the point where failover occurred. In an alternative embodiment application 202 may recreate the data of the cache session itself.

FIG. 2B is a block diagram of one embodiment of a portion of the system of an alternative embodiment of the invention. In this embodiment, application 202 sends tagged session requests to session manager 130. Session manager 130 includes a request interpreter 206 which identifies (from the tag) which of the session requests include core data in which the session requests include cache session data. The data is then segregated into the corresponding core session object 170 or cache session object 210 respectively. These objects may be managed separately in shared memory 140 and local cache 164 respectively. Failover may be handled as described in connection with the embodiment of FIG. 2A.

At block 330, a determination is made and a failover is necessary. The session manager passes the core session object to an alternate instance of the application likely residing on a separate application server at block 332. In some embodiments, the object may be passed to an application in a separate instance within the cluster. At block 334, a determination is made if the session has ended. If it has not, the next received request begins processing at block 336.

Figure 3A:
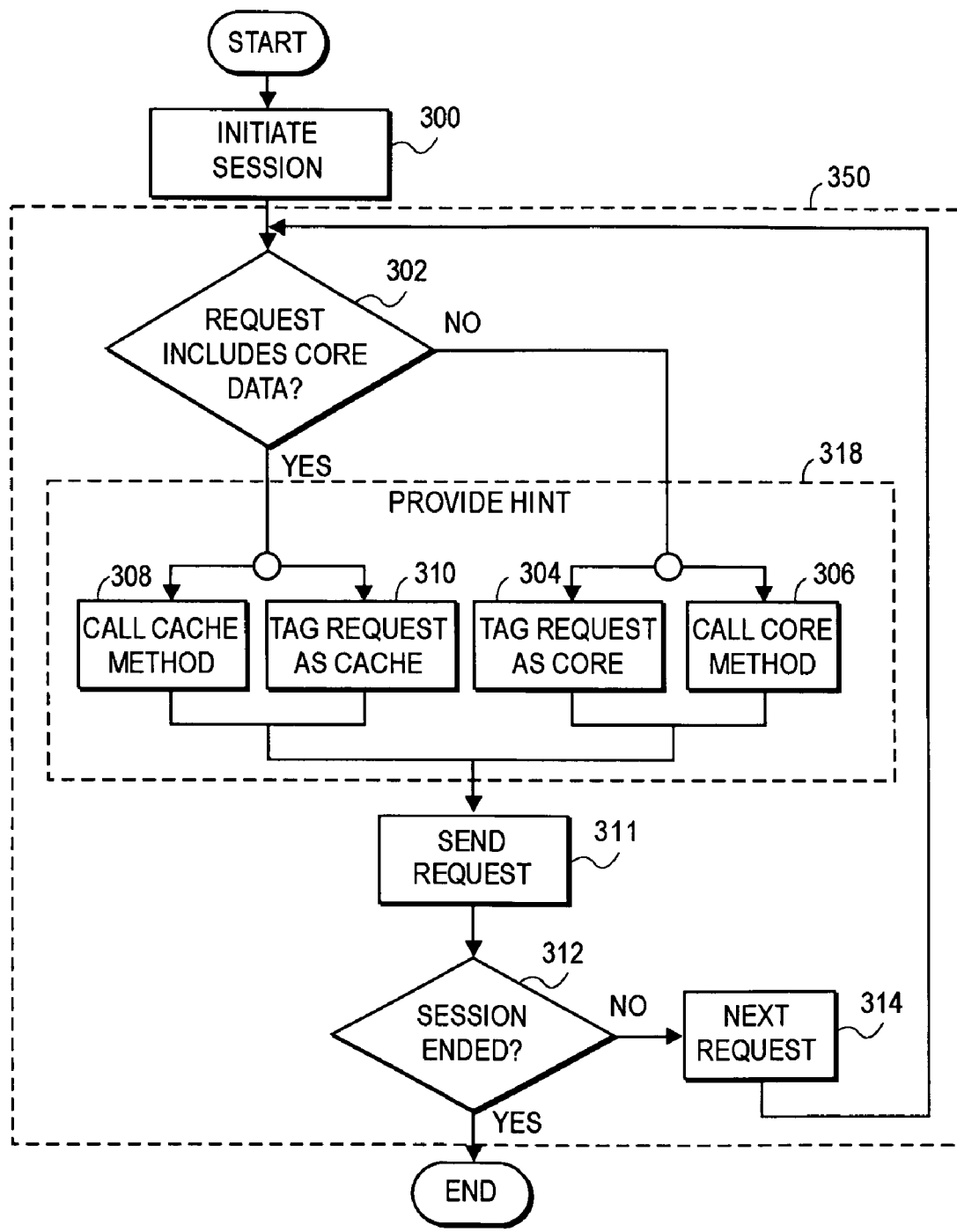
FIG. 3A is a flow diagram of operation in an application according to one embodiment of the invention.

FIG. 3A is a flow diagram of operation in an application according to one embodiment of the invention. The application initiates a session at block 300. A determination is made at block 302 whether the request to be sent to the session manager includes core data. Request from the application to the session manager should be distinguished from requests between the client and the server. Unless otherwise indicated, "request" as used herein refers to a request between the application and session manager. "Client request" refers to requests between the client and the server. If the request to be sent includes core data, a hint is provided 318. In various embodiments, it can be tagged as including core data at block 304 or an explicit call to a core method may be made at block 306. If the request to the session manager does not include core data, a hint may be provided 318. It may be tagged at block 310 or a call to a cache method may be made at block 308. As a general matter, an embodiment of the invention will generally include either blocks 304 and 310 or blocks 306 and 308. These represent only a couple examples of how the application may hint to the session manager which session requests include core data. After the hint the request is sent through the session manager at block 311. A determination is made by the application at block 312 whether the session has ended. If it has not, the next request is processed beginning at block 314. In some embodiments, between a pair of requests to the session manager, there may be any number, though usually one, client request(s). Client requests do not directly impact the flow discussed herein.

Figure 3B:
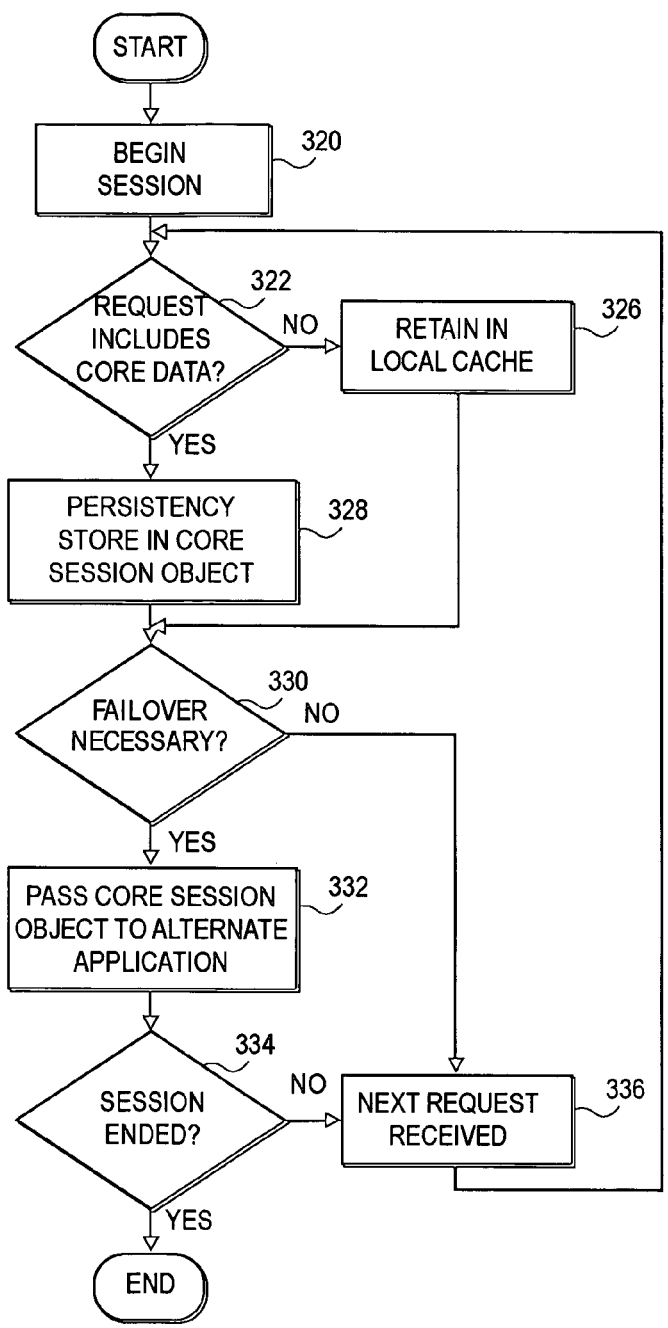
FIG. 3B is a flow diagram of operation in the session manager according to one embodiment of the invention.

FIG. 3B is a flow diagram of operation in the session manager according to one embodiment of the invention. At block 320, a session begins. At block 322, a determination is made if an incoming request from the application includes core data. This determination may be the result of interpreting a hint provided by the application. In various embodiments, a hint may be an explicit call to, e.g., a core method or may be tagging the request is containing (not containing) core data. If the request does not include core data, the data may be retained in a local cache or otherwise managed as a separate object at block 326. If the request is determined to include core data, the data may be persistently stored in core session object at block 328. This may result in the core session object being persisted to a database, retained in a file system or retained in shared memory. As used herein, persistent storage of the core session object means that it is stored persistently relative to a failure of the server process handling the session, e.g., it is stored outside the server process such that a crash of the server node does not result in a loss of the core session object. By defaulting to core value where no hint is present, backward compatibility is inherently maintained because all requests will be treated as core data and the core session object will include all session data.

At block 330, a determination is made and a failover is necessary. The session manager passes the core session object to an alternate instance of the application likely residing on a separate application server at block 332. In some embodiments, the object may be passed to an application in a separate instance within the cluster. At block 334, a determination is made if the session has ended. If it has not, the next received request begins processing at block 336.

Figure 3C:
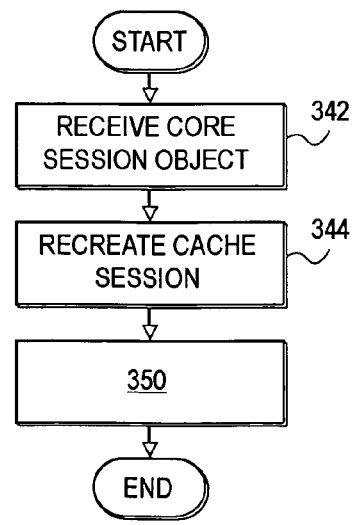
FIG. 3C is a flow diagram of operation in an alternative application in response to a failover condition.

FIG. 3C is a flow diagram of operation in an alternative application in response to a failover condition. Application receives the core session object at block 342 from the session manager. At block 344, the application recreates the cache session data. In one embodiment, an API, including a recreation method, may be made available to the application. In such embodiment, the application calls the recreation method, which will perform the recreation/derivation of cache session data. The alternate application then continues the session at the point the failover occurred as shown in FIG. 3A.

Elements of embodiments may also be provided as a machine-readable storage medium for storing the machine-executable instructions. The machine-readable storage medium may include, but is not limited to, flash memory, optical disks, CD-ROMs, DVD ROMs, RAMs, EPROMs, EEPROMs, magnetic or optical cards, or other type of machine-readable storage media suitable for storing electronic instructions. For example, embodiments of the invention may he downloaded as a computer program which may be transferred from a remote computer (e.g., a server) to a requesting computer (e.g., a client) by way of data signals via a communication link (e.g., a modem or network connection).

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention.

In the foregoing specification, the invention has been described with reference to specific embodiments thereof. It will, however, be evident that various modifications and changes can be made thereto without departing from the broader spirit and scope of the invention as set forth in the appended claims. The specification and drawings are, accordingly, to be regarded in an illustrative rather than a restrictive sense.

What is claimed is:

1. A method for session management of a server, the method comprising:
  receiving, by a service manager of the server, one or more service requests;
  dispatching the one or more service requests to a first server process and a second server process;
  segregating data of a session, corresponding to the one or more service requests, into core data and cache data, the cache data managed by the first server process associated with the server, wherein segregating the data of the session comprises:
    in the presence of a tag associated with the one or more session requests, identifying from the tag whether the data of the session is core data or cache data;
    segregating the data of the session into core data and cache data in response to the identified tag;
    calling a core method, in the absence of the tag, in a session manager from the application if data should be in the core data, wherein the core method creates a core session object to retain the core data;
    adding the core data to the core session object in response to calling the core method; and
    calling a cache method, in the absence of the tag, in the session manager from the application if data should be in the cache data, wherein the cache method creates a cache session object to retain the cache data, and wherein the cache session object is managed in a local cache of the first server process while the core session object is managed in a shared memory of the server;
  persistently storing the core data outside the first server process;
  providing access by an application within the second server process to the core data responsive to a failover caused by a failure condition in the first server process;
  discarding the cache data responsive to the failover; and
  reconstructing the cache data from the core data via the application within the second server process having access to the core data.

2. The method of claim 1, wherein the first server process includes a first virtual machine while the second server process includes a second virtual machine.

3. The method of claim 1, further comprises:
  determining if the one or more service requests includes core data, wherein the determining comprises:
    hinting to the session manager which data should be in the core data and which data should be in the cache data.

4. The method of claim 3, wherein hinting to the session manager comprises:
  tagging data of the session, from the application, as derivable cache data or non-derivable core data.

5. The method of claim 1, wherein the shared memory of the server is a Shared Closure.

6. The method of claim 1, wherein providing access by the application comprises:
  passing an object containing the core data to the application.

7. The method of claim 1, wherein identifying from the tag whether the data of the session is core data or cache data is performed by a request interpreter of the session manager.

8. An article of manufacture having a machine-readable storage medium containing machine executable instructions that when executed cause a machine to perform a method for session management of a server, the method comprising:

receiving, by a service manager of the server, one or more service requests;

dispatching the one or more service requests to a first server process and a second server process;

segregating data of a session, corresponding to the one or more service requests, into core data and cache data, the cache data managed by the first server process associated with the server, wherein segregating the data of the session comprises:

in the presence of a tag associated with the one or more session requests, identifying from the tag whether the data of the session is core data or cache data;

segregating the data of the session into core data and cache data in response to the identified tag;

calling a core method, in the absence of the tag, in a session manager from the application if data should be in the core data, wherein the core method creates a core session object to retain the core data;

adding the core data to the core session object in response to calling the core method; and calling a cache method, in the absence of the tag, in the session manager from the application if data should be in the cache data, wherein the cache method creates a cache session object to retain the cache data, and wherein the cache session object is managed in a local cache of the first server process while the core session object is managed in a shared memory of the server;

persistently storing the core data outside the first server process;

providing access by an application within the second server process to the core data responsive to a failover caused by a failure condition in the first server process;

discarding the cache data responsive to the failover; and reconstructing the cache data from the core data via the application within the second server process having access to the core data.

9. The machine accessible medium of claim 8, wherein the first server process includes a first virtual machine while the second server process includes a second virtual machine.

10. The machine-readable storage medium of claim 8, further comprises machine executable instructions causing the machine to perform the method comprising:

determining if the one or more service requests includes core data, wherein the determining comprises:

hinting to the session manager which data should be in the core data and which data should be in the cache data.

11. The machine-readable storage medium of claim 10, wherein the machine executable instructions causing the machine to perform the method of hinting includes machine executable instructions causing the machine to further perform the method comprising:

tagging data of the session, from the application, as derivable cache data or non-derivable core data.

12. The machine-readable storage medium of claim 8, wherein the shared memory of the server is a Shared Closure.

13. The machine-readable storage medium of claim 8, wherein the machine executable instructions causing the machine to perform the method of providing includes machine executable instructions causing the machine to further perform the method comprising:

passing an object containing the core data to the application.

14. The system of claim 13, wherein identifying from the tag whether the data of the session is core data or cache data is performed by a request interpreter of the session manager.

15. The machine-readable storage medium of claim 8, wherein identifying from the tag whether the data of the session is core data or cache data is performed by a request interpreter of the session manager.

16. A system for session management of a server, the system comprising:

a persistent storage unit;

an execution environment coupled with the persistent storage unit, the execution environment having a session; and a logic having a session manager, the logic to perform the method including:

receiving, by the service manager of the server, one or more service request;

dispatching the one or more service requests to a first server process and a second server process;

segregating data of the session, corresponding to the one or more service requests, into core data and cache data, the cache data managed by the first server process of the execution environment associated with the server, wherein segregating the data of the session comprises:

in the presence of a tag associated with the one or more session requests, identifying from the tag whether the data of the session is core data or cache data;

segregating the data of the session into core data and cache data in response to the identified tag;

calling a core method, in the absence of the tag, in the session manager from the application if data should be in the core data, wherein the core method creates a core session object to retain the core data;

adding the core data to the core session object in response to calling the core method; and calling a cache method, in the absence of the tag, in the session manager from the application if data should be in the cache data, wherein the cache method creates a cache session object to retain the cache data, and wherein the cache session object is managed in a local cache of the first server process while the core session object is managed in a shared memory of the server;

persistently storing the core data outside the first server process;

providing access by an application within the second server process to the core data responsive to a failover caused by a failure condition in the first server process;

discarding the cache data responsive to the failover; and reconstructing the cache data from the core data via the application within the second server process having access to the core data.

17. The system of claim 16, wherein the execution environment comprises:

a first virtual machine associated with the first server process; and a second virtual machine associated with the second server process.

18. The system of claim 16, wherein the persistent storage unit comprises a Shared Closure.

19. The system of claim 16, wherein the shared memory of the server is a Shared Closure.

* * * * *